United States Patent [19]
Komatsu et al.

[11] Patent Number: 5,005,094
[45] Date of Patent: Apr. 2, 1991

[54] MODE CHANGEOVER MECHANISM WITH FLAT CAM SURFACE FOR A TAPE PLAYER

[75] Inventors: Norimasa Komatsu; Asashi Miyazaki, both of Kakuda, Japan

[73] Assignee: Alps Electric Co., Ltd., Tokyo, Japan

[21] Appl. No.: 424,359

[22] Filed: Oct. 19, 1989

[30] Foreign Application Priority Data

Dec. 12, 1988 [JP] Japan .............................. 63-161741[U]
Feb. 10, 1989 [JP] Japan ...................................... 1-15065

[51] Int. Cl.⁵ .......................... G11B 5/008; G11B 5/54
[52] U.S. Cl. ..................................... 360/105; 360/96.3; 360/90; 242/200
[58] Field of Search ........ 360/90, 105, 104, 96.3–96.4, 360/137; 242/200, 201, 197–199

[56] References Cited

U.S. PATENT DOCUMENTS

| | | | |
|---|---|---|---|
| 4,399,475 | 8/1983 | Shimomae | 360/96.3 X |
| 4,470,087 | 9/1984 | Sakamoto et al. | 360/105 X |
| 4,612,589 | 9/1986 | Sakane | 360/137 |
| 4,819,891 | 4/1989 | Kamijo | 360/96.4 |
| 4,922,357 | 5/1990 | Komatsu et al. | 360/105 X |

FOREIGN PATENT DOCUMENTS 55-89917  7/1980  Japan .................................... 360/90
62-8444   1/1987  Japan .

*Primary Examiner*—Robert S. Tupper
*Assistant Examiner*—Alfonso Garcia
*Attorney, Agent, or Firm*—Guy W. Shoup; Norman R. Klivans

[57] ABSTRACT

A mode changeover mechanism for changing over the operating mode of a tape player having a magnetic head for recording signals on a magnetic tape contained in a tape cassette loaded on the tape player and reproducing signals recorded on the magnetic tape. The mode changeover mechanism comprises a base plate mounted with the magnetic head and capable of moving toward the magnetic tape to bring the magnetic head into contact with the magnetic tape and away from the magnetic tape to separate the magnetic head from the magnetic tape, a spring biasing the base plate away from the magnetic tape to separate the magnetic head from the magnetic tape, a changeover cam for moving the base plate toward the magnetic tape against the resilience of the spring, and a motor for driving the changeover cam for rotation. The changeover cam has flat cam surfaces respectively for stably holding the base plate at a position for holding the magnetic head in contact with the magnetic tape and stably holding the base plate at a position for holding the magnetic head separated from the magnetic tape. When in action, the flat cam surfaces of the changeover cam are in plane contact with a portion of the base plate to hold the base plate stably in place.

5 Claims, 10 Drawing Sheets

MODE CHANGEOVER MECHANISM WITH FLAT CAM SURFACE FOR A TAPE PLAYER

BACKGROUND OF THE INVENTION

1. Field of the Invention

The present invention relates to a tape player the operating mode is changed over by a mode changeover cam driven by a motor and, more particularly, to a mode changeover mechanism for changing over the operating mode of a tape player, having a mode changeover cam capable of surely and stably operating for mode changeover operation. This application is related to copending U.S. patent application No. 428,229, filed on Oct. 26, 1989 and co-owned U.S. Pat. No. 4,922,357.

2. Description of the Prior Art

Recently, tape players of a so-called logic control system using a motor for mode changeover operation have generally been used.

FIG. 11 shows a mode changeover mechanism for such tape players, disclosed, for example, in Japanese Utility Model Provisional Publication (Kokai) No. 62-8444. This known mode changeover mechanism has a magnetic head 42 mounted on a base plate 41 capable of moving in directions A and B. The base plate 41 is moved in the direction A to bring the magnetic head 42 into contact with a magnetic tape, and the base plate 41 is moved in the direction B to separate the magnetic head 42 from the magnetic tape. The base plate 41 is biased in the direction B by a spring 43. A changeover cam 44 for driving the base plate 41 is formed integrally with a mode changeover gear 45 meshing with a driving gear 46 which, in turn, is driven by a motor. When the mode changeover gear 45 is driven by the driving gear 46, the changeover cam 44 pushes the base plate 41 at a lug 41a formed by bending a portion of the base plate 41 to move the base plate 41 in the direction A against the resilience of the spring 43. The mode changeover gear 45 is provided with recesses 45a and 45b. The mode changeover gear 45 and the driving gear 46 are disengaged while the recess 45a or 45b is opposite to the driving gear 46.

The changeover cam 44 of this known mode changeover mechanism for a tape player has a very smooth cam surface to transmit a driving force through the lug 41a to the base plate 41 so that the base plate 41 is moved smoothly. In the stop mode as shown in FIG. 11, the lug 41a is in contact with the lowest point 44a of the changeover cam 44, namely, a point corresponding to the bottom of the stroke, and the base plate 41 is at the limit position of movement in the direction B. In a play mode in which the magnetic head 42 is in contact with the magnetic tape, the lug 41a of the base plate 41 is in contact with the highest point 44b of the changeover cam 44, namely, a point corresponding to the top of the changeover cam 44, and the base plate 41 is at the limit position of movement in the direction A.

However, since the smooth cam surface of the changeover cam 44 has no portion for stably holding the base plate 41, it is impossible to hold the base plate 41 stably at a desired position and the changeover cam 44 is liable to run beyond a desired position. For example, in the play mode, in which the point 44b of the changeover cam 44 is in contact with the lug 41a, it is possible that the changeover cam 44 is turned by an external shock to allow the base plate 41 to move, because the point 44b of the changeover cam 44 is in an unstable line contact with the lug 41a. In changing the operating mode of the tape player from the play mode to the stop mode by turning the changeover cam 44, it is possible that the base plate 41 is not placed stably at the position for the stop mode as shown in FIG. 11 due to the inertial turning of the changeover cam 44 and the mode changeover gear 45 beyond a predetermined position after the lowest point 44a of the changeover cam 44 has come into contact with the lug 41a. When a switch SW, which is closed by the base plate 41 when the base plate 41 is moved to the position for the stop mode as shown in FIG. 11, is employed for detecting the operating mode of the tape player, the switch SW will be closed once upon the arrival of the base plate 41 at the position for the stop mode, and then the switch SW will be opened if the base plate 41 moves in the direction A due to the excessive turning of the changeover cam 44 beyond the predetermined position. Such an accidental operation of the switch SW causes erroneous mode detection.

SUMMARY OF THE INVENTION

Accordingly, it is an object of the present invention to provide a mode changeover mechanism for a tape player, employing a changeover cam capable of stably holding the base plate at a desired position to ensure accurate mode changeover operation.

In one aspect of the present invention, a mode changeover mechanism comprises a base plate mounted with a magnetic head and capable of moving in opposite directions to bring the magnetic head into contact with a magnetic tape and to separate the magnetic head from the magnetic tape, a spring biasing the base plate in the direction to separate the magnetic head from the magnetic tape, and a changeover cam driven by a motor for rotation to move the base plate against the resilience of the spring. The mode changeover mechanism is characterized in that the cam surface of the changeover cam has a first flat portion which engages the base plate to hold the base plate stably at a position to keep the magnetic head in contact with the magnetic tape, and the flat portion extends perpendicularly to and on opposite sides of a center line passing the center of rotation of the changeover cam and extending in the directions of movement of the base plate when the flat portion is holding the base plate at the position to keep the magnetic head in contact with the magnetic tape.

In another aspect of the present invention, the cam surface of the changeover cam has a second flat portion which engages the base plate immediately after the first flat portion has been disengaged from the base plate to hold the base plate at a position where the magnetic head mounted on the base plate is separated from the magnetic tape.

When the play mode or the review mode is selected, the changeover cam of the mode changeover mechanism of the present invention drives the base plate directly until the first flat portion of the changeover cam comes into plane contact with the base plate to hold the base plate stably in place so that the magnetic head is kept in contact with the magnetic tape. When the changeover cam is turned from the position where the first flat surface is in contact with the base plate, the first flat surface moves away from the base plate to allow the spring to move the base plate so that the magnetic head is separated from the magnetic tape. Then, the second flat surface comes into plane contact with the base plate, so that the base plate is held stably at a position for the stop mode, in which the magnetic head is separated from the magnetic tape, and the changeover cam is restrained from turning beyond a position for the stop mode.

The function of the mode changeover mechanism is the same if the changeover cam engages the base plate indirectly through a member provided on the base plate.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

Figure 1:
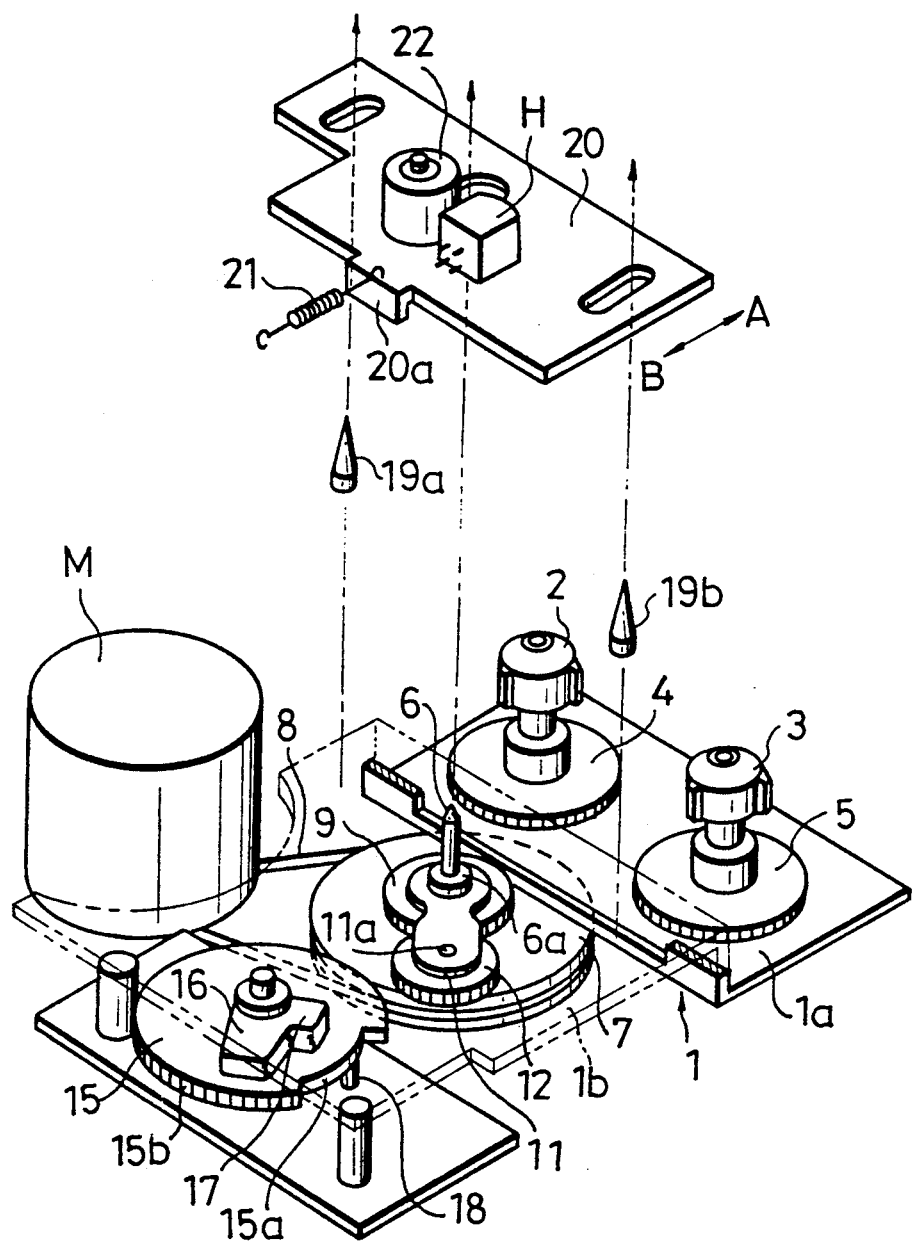
FIG. 1 is a perspective view of an essential portion of a tape player incorporating a mode changeover mechanism in a first embodiment according to the present invention.
Figure 2:
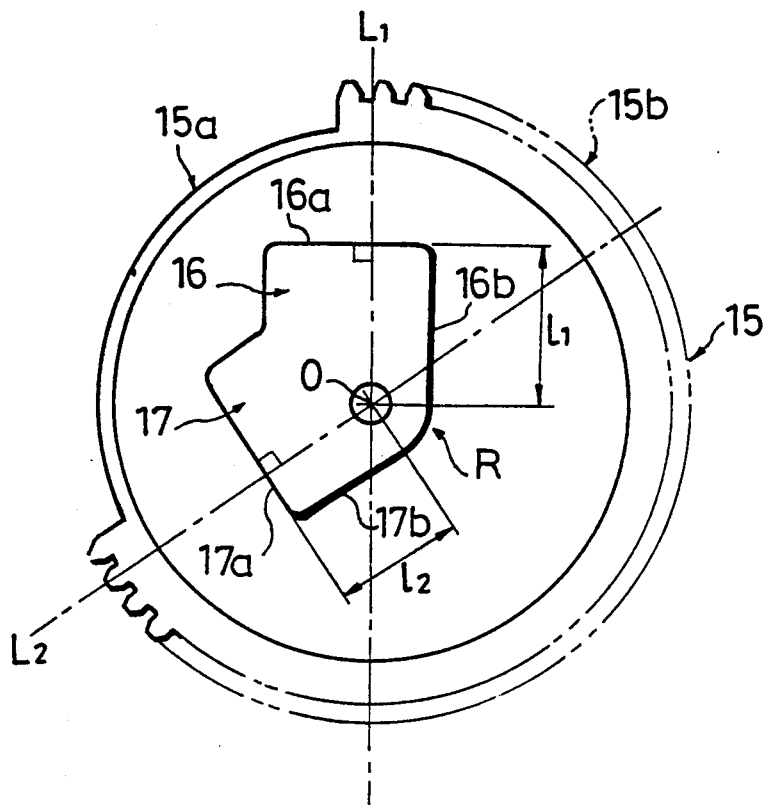
FIG. 2 is a plan view of a mode changeover gear and a changeover cam included in the mode changeover mechanism of FIG. 1.

First Embodiment (FIGS. 1 and 2)

A mode changeover mechanism in a first embodiment according to the present invention will be described as applied to a tape player using a miniature tape cassette, such as a tape player incorporated into an automatic answering telephone set.

Tape Player:

Referring to FIG. 1, a chassis 1 is formed by bending a metal plate in a shape having a cross section resembling the letter Z, and has a lower section 1a and an upper section 1b. A winding reel spindle 2 and an rewinding reel spindle 3 are supported for rotation on the lower portion 1a of the chassis 1. Reel gears 4 and 5 are put on the lower ends of the reel spindles 2 and 3 and are connected to the reel spindles 2 and 3 by slip friction mechanisms, respectively. In case an excessively high tape tension acts on the reel spindle 2 or 3, the reel spindle 2 or 3 slips relative to the reel gear 4 or 5 to absorb the difference between the reel spindle 2 and the reel gear 4 or between the reel spindle 3 and the reel gear 5 in rotating speed.

Figure 5:
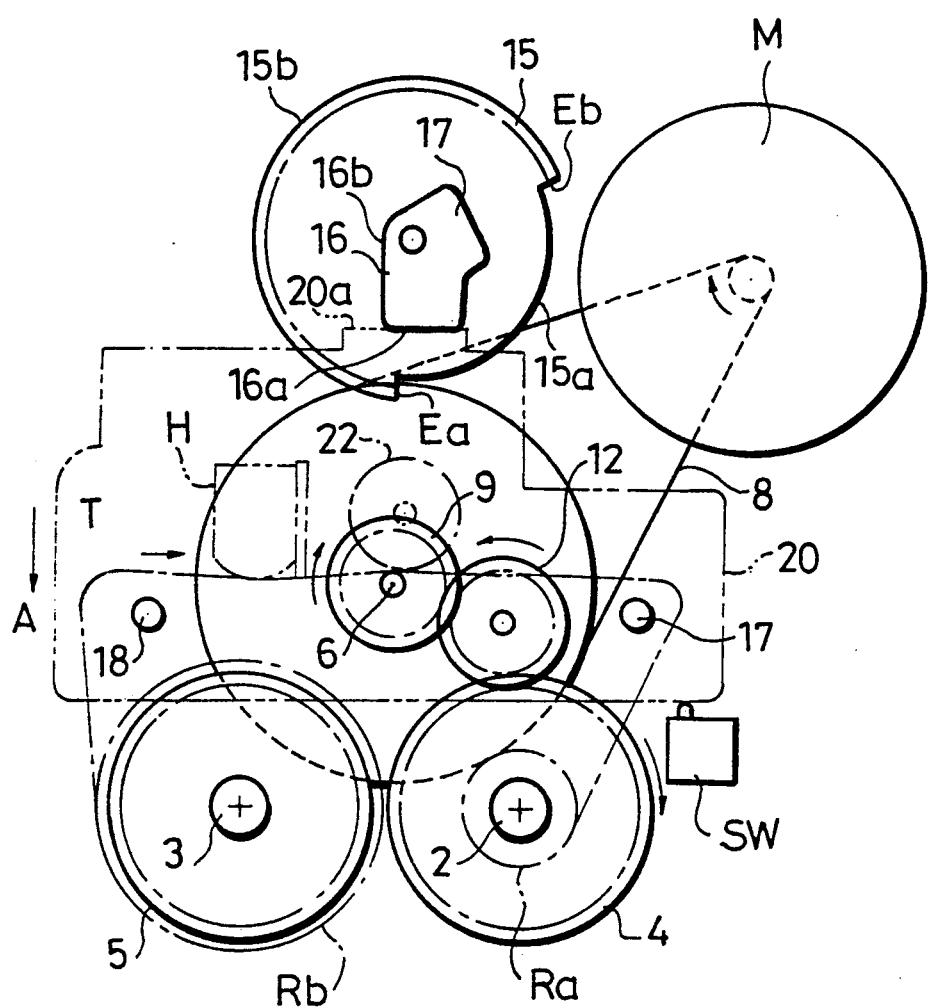
Figure 7:
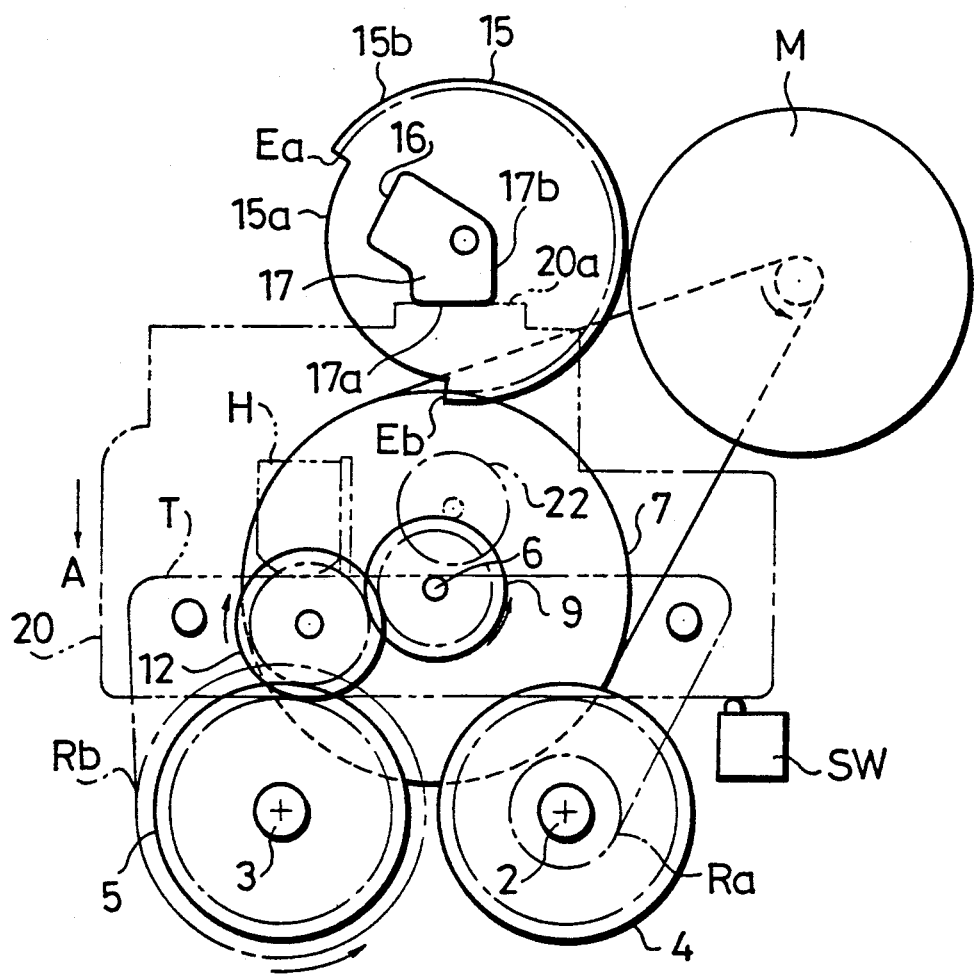
Figure 8:
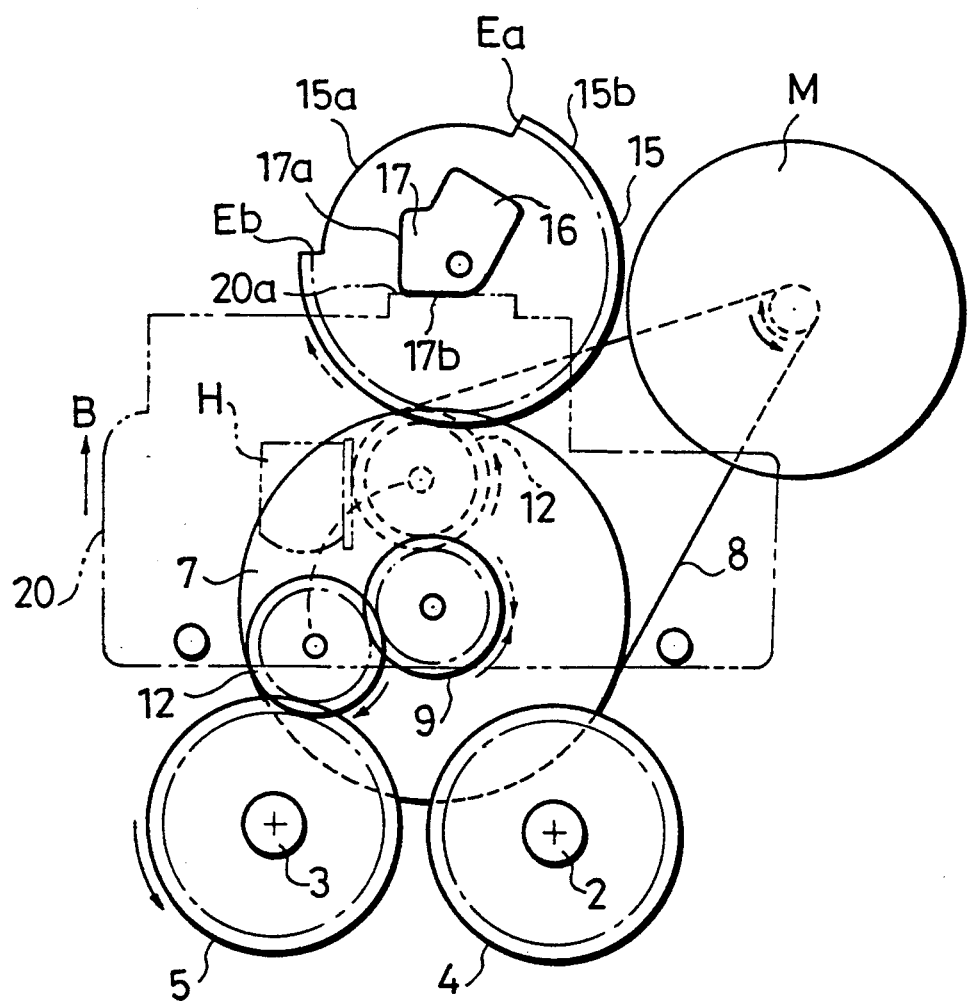

A capstan 6 is supported for rotation in a bearing held in a bearing housing 6a provided on the upper section 1b of the chassis 1. A flywheel 7 formed integrally with the capstan 6 is disposed under the upper section 1b. A motor M is disposed on one side of the chassis 1. A driving belt 8 is extended between a driving pulley attached to the output shaft of the motor M and the flywheel 7 to drive the flywheel 7 together with the capstan 6 for rotation by the motor M. A driving gear 9 is provided coaxially with and fixedly on the upper surface of the flywheel 7. A carrier arm 11 is supported on the bearing housing 6a provided on the upper section 1b. A planet pinion 12 is supported rotatably by a spindle 11a on the free end of the carrier arm 11 so as to be in engagement with the driving gear 9. The planet pinion 12 is loaded with a small load against free rotation relative to the carrier arm 11 by a suitable means, such as a spring, so that the carrier arm 11 turns in the direction of rotation of the driving gear 9 and the planet pinion 12 revolves around the driving gear 9 when the driving gear rotates in either a clockwise direction or a counterclockwise direction. When the driving gear rotates in a clockwise direction, the planet pinion 12 revolves around the driving gear 9 to a position where the planet pinion 12 engages the winding reel gear 4 (FIG. 5). When the driving gear 9 rotates in a counterclockwise direction, the planet pinion 12 revolves around the driving gear 9 to a position where the planet pinion 12 engages the rewinding reel gear 5 (FIG. 7).

A mode changeover gear 15 is provided under the upper section 1b of the chassis 1. The mode changeover gear 15 is positioned so that the planet pinion 12 engages the mode changeover gear 15 on the way from the position where the planet pinion 12 engages the winding reel gear 4 to the position where the planet pinion 12 engages the rewinding reel gear 5, and vice versa. The mode changeover gear 15 has teeth 15b formed in a predetermined angular range, and a recess 15a.

As shown in FIG. 2, a rectangular first changeover cam 16 and a rectangular second changeover cam 17, which are joined integrally in a single changeover cam having a shape resembling the letter L, are provided on the upper surface of the mode changeover gear 15. The top of the first changeover cam 16 is a flat driving cam surface 16a having a predetermined area and extending on the opposite sides of an imaginary center line $L_1$ passing the center O of rotation of the changeover cam and extending perpendicularly to the driving cam surface 16a. The first changeover cam 16 also has a flat stopping cam surface 16b having a predetermined area and extending next to the driving cam surface 16a. The stopping cam surface 16b is perpendicular to the driving cam surface 16a, namely, parallel to the center line $L_1$. Similarly, the top of the second changeover cam 17 is a flat driving cam surface 17a having a predetermined area and extending on the opposite sides of an imaginary center line $L_2$ passing the center 0 of rotation of the changeover cam and extending perpendicularly to the driving cam surface 17a. The second changeover cam 17 also has a flat stopping cam surface 17b having a predetermined area and extending next to the driving cam surface 17a. The stopping cam surface 17b is parallel to the center line $L_2$. The stopping cam surface 16b of the first changeover cam 16 and the stopping cam surface 17b of the second changeover cam 17 are connected by a curved surface R, which is a portion of the circumference of a circle having its center on the center O.

The distance $l_1$ between the driving cam surface 16a of the first changeover cam 16 and the center O of rotation is greater than the distance $l_2$ between the driving cam surface 17a of the second changeover cam 17 and the center O of rotation. The first changeover cam 16 functions in setting a play mode, while the second changeover cam 17 functions in setting a review mode.

A base plate 20 is provided on the upper surface of the upper section 1b of the chassis 1 and is guided for sliding motion in directions A and B by guide members including positioning pins 19a and 19b provided on the upper section 1b of the chassis 1. A spring 21 is extended between the rear end of the base plate 20 and the chassis 1 to bias the base plate 20 in the direction B. A lug 20a is formed at the rear end of the base plate 20 so as to engage the first changeover cam 16 and the second changeover cam 17. A magnetic head H and a pinch roller 22 are mounted on the base plate 20. The pinch roller 22 is brought into contact with and is moved away from the capstan 6.

The operation of the tape player thus constructed will be described hereinafter with reference to FIGS. 4 to 8.

A miniature tape cassette, not shown, is loaded on the tape player and is positioned by the positioning pins 19a and 19b. The reels of the tape cassette engage the reel spindles 2 and 3 respectively.

Figure 4:
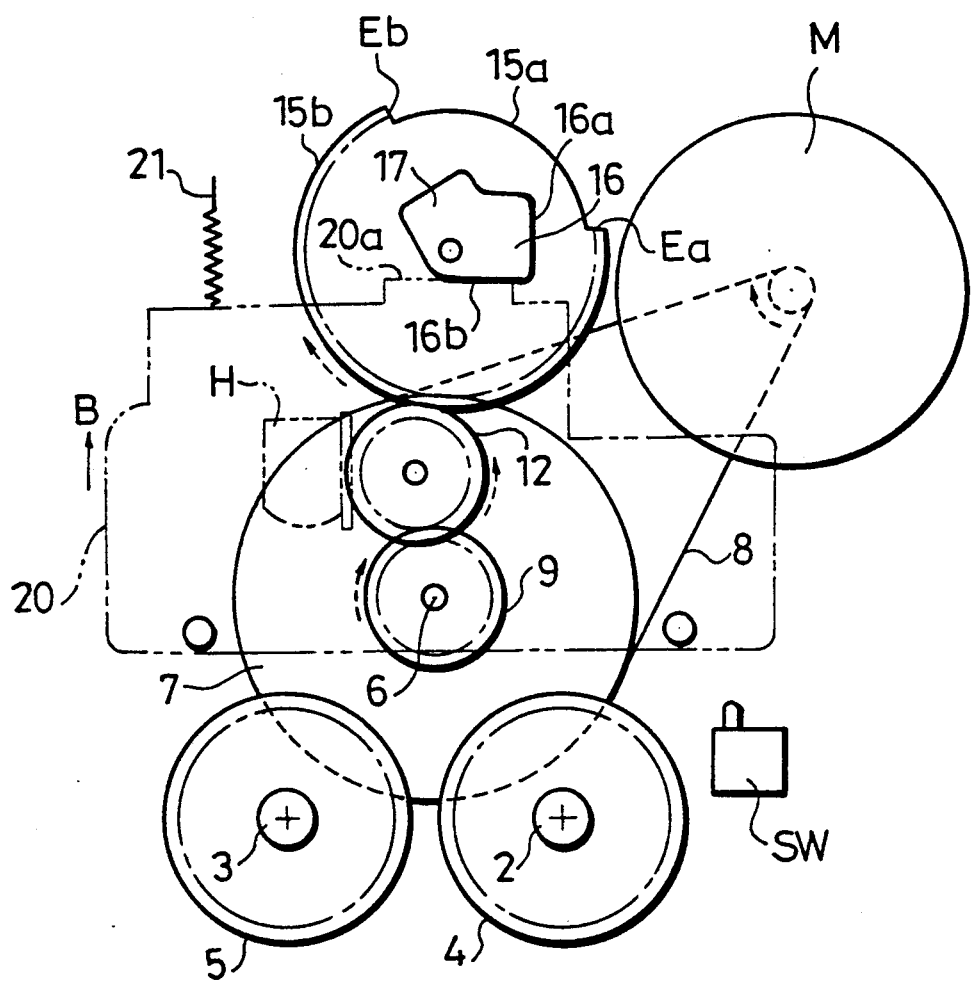
FIGS. 4 to 8 are plan views of the driving mechanism of a tape player incorporating the mode changeover mechanism in the first embodiment according to the present invention, showing the states of the driving mechanism respectively in the stop mode, a play mode, a FF (fast feed) mode, a review mode and a REW (rewinding) mode.

Stopping Mode (FIG. 4):

As shown in FIG. 4, the driving cam surface 16a of the first changeover cam 16 provided on the mode changeover gear 15 is separated from the lug 20a of the base plate 20, and the lug 20a is in contact with the stopping cam surface 16b. Consequently, the base plate 20 is held at a stopping position by the spring 21 biasing the base plate 20 in the direction B. With the base plate 20 at the stopping position, the magnetic head H is separated from the magnetic tape T of the tape cassette, and the pinch roller 22 is separated from the capstan 6.

Changeover from the Stop Mode to the Play Mode (FIGS. 4 and 5):

In changing over the operating mode of the tape player from the stop mode to the play mode, such as the recording mode or the playback mode, the motor M is driven so that the output shaft thereof rotates in a clockwise direction as viewed in FIG. 4. Then, the driving gear 9 drives the carrier arm 11 through the planet pinion 12 for turning in a clockwise direction to bring the planet pinion 12 into engagement with the teeth 15b of the mode changeover gear 15. The output power of the motor M is transmitted through the driving gear 9 and the planet pinion 12 to the mode changeover gear 15 to drive the mode changeover gear 15 for rotation in a clockwise direction. While the mode changeover gear 15 is driven, the planet pinion 12 stays at the same position. Upon the arrival of the last tooth Ea, namely, the tooth at the right end of the arrangement of the teeth 15b as viewed in FIG. 4, of the mode changeover gear 15 at a position shown in FIG. 5, the planet pinion 12 is disengaged from the mode changeover gear 15 and is allowed to revolve around the driving gear 9 in a clockwise direction and engages the winding reel gear 4. At the same time, the first changeover cam 16 is turned together with the mode changeover gear 15 pushing the base plate 20 at the lug 20a in the direction A against the resilience of the spring 21 by the driving cam surface 16a to set the base plate 20 at a playing position as shown in FIG. 5 for the play mode.

In the play mode shown in FIG. 5, the base plate 20 is located at the playing position, where the magnetic head H is in contact with the magnetic tape T of the tape cassette, and the magnetic tape T is pressed against the capstan 6 by the pinch roller 22. The motor M continues rotating in a clockwise direction, and thereby the capstan 6 rotates in a clockwise direction. Consequently, the tape T runs at a fixed speed corresponding to the rotating speed of the capstan 6 to the right, as viewed in FIG. 5. The power of the motor M is transmitted through the driving gear 9 and the planet pinion 12 to the reel gear 4 to rotate the winding reel spindle 2 in a clockwise direction. Consequently, the winding reel Ra of the tape cassette is rotated in a clockwise direction to wind the magnetic tape T. The difference between the rotating speed of the reel spindle 2 and that of the capstan 6 corresponding to the running speed of the magnetic tape T is absorbed by the slip friction mechanism connecting the reel gear 4 and the reel spindle 2. The magnetic head H operates for recording electric signals on the moving magnetic tape T or for playing back magnetic signals recorded on the moving magnetic tape T.

In the play mode, the flat driving cam surface 16a of the first changeover cam 16 is in stable plane contact with the flat surface of the lug 20a of the base plate 20, so that the base plate 20 and the mode changeover gear 15 are held stably in a state shown in FIG. 5. Furthermore, since the driving cam surface 16a of the first changeover cam 16 extends on the opposite sides of the center line $L_1$ as shown in FIG. 2, the base plate 20 biased in the direction B by the spring 21 applies no moment of force to the first changeover cam 16, and hence the mode changeover gear 15, hence the first mode changeover cam 16, is never rotated by the base plate 20. In the play mode shown in FIG. 5, a mode changeover switch SW is closed by the base plate 20.

Cancellation of the Play Mode (FIGS. 5 and 6):

The motor M is driven in a counterclockwise direction to cancel the play mode (FIG. 5). The motor M drives the driving gear 9 for rotation in a counterclockwise direction and thereby the carrier arm turns in a counterclockwise direction to disengage the planet pinion 12 from the reel gear 4 and to make the planet pinion 12 revolve around the driving gear 9. Consequently, the winding reel spindle 2 is disconnected from the motor M. The planet pinion 12 revolves further in a counterclockwise direction around the driving gear 9 to a position indicated by broken lines in FIG. 6, where the planet pinion 12 engages the last tooth Ea, namely, the tooth at the right end of the arrangement of the teeth 15b of the mode changeover gear 15. Then, the mode changeover gear 15 is driven through the driving gear 9 and the planet pinion 12 for rotation in a counterclockwise direction by the motor M. In this state, the gears and the pinion rotate respectively in directions indicated by arrows in FIG. 6. In the state shown in FIG. 6, the driving cam surface 16a of the first changeover cam 16 is disengaged completely from the lug 20a. Upon the disengagement of the driving cam surface 16a of the first changeover cam 16 from the lug 20a, the base plate 20 retracted in the direction B by the spring 21 and the lug 20a is brought into stable plane contact with the stopping cam surface 16b of the first changeover cam 16. Thus, the base plate 20 is held in stable contact with the stopping cam surface 16b by the spring 21. Accordingly, the mode changeover cam 16 is never caused to turn beyond the stopping position shown in FIG. 6 by the counterclockwise inertial rotation of the mode changeover gear 15 in rotating from the position shown in FIG. 5 to that shown in FIG. 6. Thus, the base plate 20 is settled immediately and stably at the position shown in FIG. 6. In this state, the base plate 20 is separated from the mode changeover switch SW and the mode changeover switch SW detects the completion of the mode changing operation. Since the first mode changeover cam 16 is restrained from excessive rotation, the mode changeover switch SW is prevented from erroneous mode detecting operation. As the base plate is retracted in the direction B, the magnetic head H is disengaged from the magnetic tape T and the pinch roller 22 is disengaged from the capstan 6.

Figure 6:
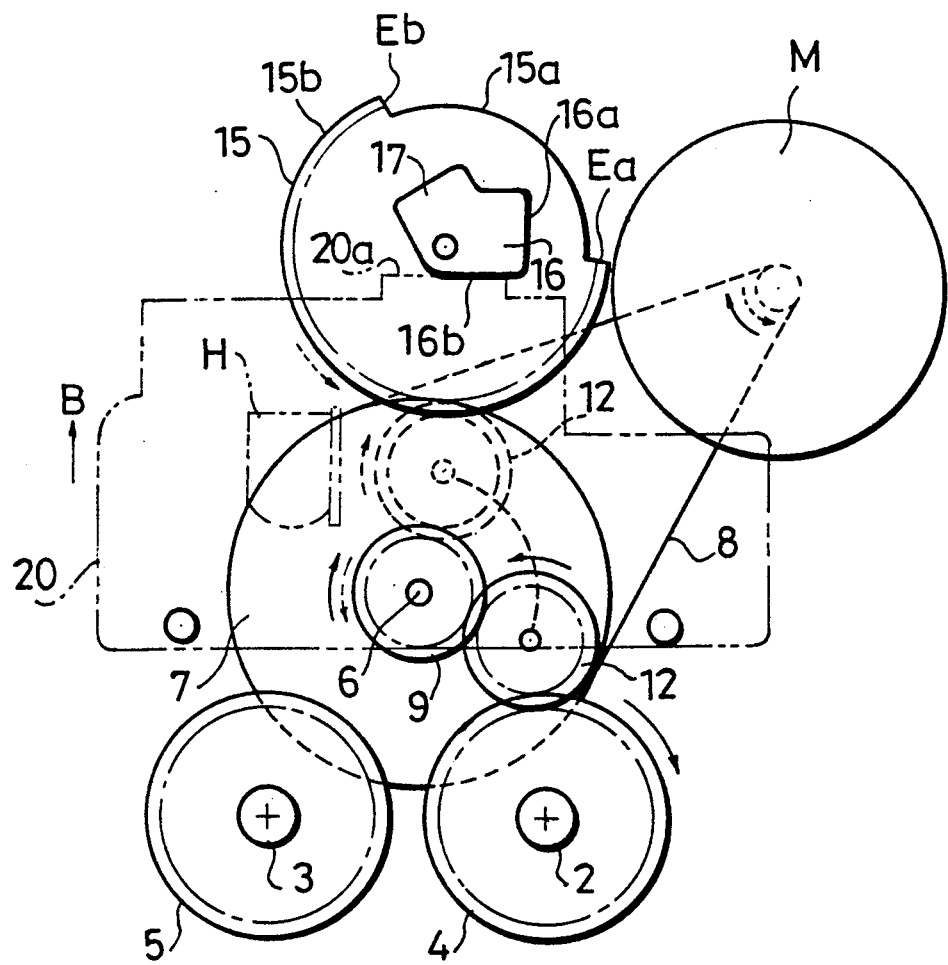

Changeover to the FF Mode (FIG. 6):

In setting the tape player in the FF mode for fast tape feeding from the stable state shown in FIG. 6, the motor M is driven for rotation in a clockwise direction, as viewed in FIG. 6, indicated by an arrow in FIG. 6 to rotate the driving gear 9 in a clockwise direction. Then, the planet pinion 12 revolves away from the mode changeover gear 15 around the driving gear 9 in a clockwise direction and engages the reel gear 4. Since the base plate 20 is retracted in the direction B as shown in FIG. 6, the magnetic head H and the pinch roller 22 are separated from the magnetic tape T. Then, the reel gear 4 is driven by the planet pinion 12 in a clockwise direction to wind the magnetic tape T on the reel driven by the reel spindle 2. In the FF mode the motor M rotates at a high rotating speed to wind the magnetic tape T at a high winding speed.

Changeover to the Review Mode (FIGS. 6 and 7):

In the review mode, the magnetic head H is in touch with the magnetic tape, while the magnetic tape T is wound at a high winding speed. Automatic control operations including automatic seek operation are carried out in the review mode.

Operation for setting the tape player in the review mode is started from a state where the planet pinion 12 is at a position indicated by a continuous line in FIG. 6 (FF mode) or from a state where the planet pinion 12 is at a position indicated by a broken line in FIG. 6. When the motor M is actuated to rotate in a counterclockwise direction in the state shown in FIG. 6, the driving gear 9 is driven for rotation in a counterclockwise direction, and thereby the planet pinion 12 is caused to revolve in a counterclockwise direction around the driving gear 9 until the same engages the teeth 15b of the mode changeover gear 15. As the motor M continues rotating in a counterclockwise direction, the planet pinion 12 continues rotating at the position indicated by a broken line in FIG. 6 to drive the mode changeover gear 15 for rotation in a counterclockwise direction. When the mode changeover gear 15 is turned to an angular position shown in FIG. 7, the planet pinion 12 leaves the left end tooth Eb among the teeth 15b of the mode changeover gear 15, and then the planet pinion 12 starts revolving in a counter-clockwise direction around the driving gear 9 and, finally engages the rewinding reel gear 5, namely, the left-hand reel gear in FIG. 7.

While the state shown in FIG. 6 is changing to the state shown in FIG. 7, the second changeover cam 17 pushes the base plate 20 at the lug 20a. Finally, the flat driving cam surface 17a of the second changeover cam 17 comes into plane contact with the lug 20a, so that the base plate 20 is held stationary in s stable state. Since the distance l$_2$ between the driving cam surface 17a of the second changeover cam 17 and the center O of rotation of the second changeover cam 17 is smaller than the distance l$_1$ between the driving cam surface 16a of the first changeover cam 16 and the center 0 of rotation of the first changeover cam 16 which functions in setting the tape player in the play mode (FIG. 2), the movement of the base plate 20 from the fully retracted position in the direction A to the position shown in FIG. 7 is slightly smaller than that of the same from the same position in the direction A to the position in the play mode shown in FIG. 5. Accordingly, in the state shown in FIG. 7, the pinch roller 22 is not in contact with the capstan 6, and hence the rotative driving force of the capstan 6 is not transmitted to the magnetic tape T. In this state, the magnetic head H is in light touch with the magnetic tape T. In the play mode, the magnetic head H is pressed against the magnetic tape T to curve the magnetic tape T as shown in FIG. 5. When the motor M is actuated in the state shown in FIG. 7 for rotation in a counterclockwise direction, the rewinding reel gear 5 is rotated in a counterclockwise direction by the planet pinion 12. Consequently, the rewinding reel spindle 3 drives the tape reel Rb to rewind the magnetic tape T. In rewinding the magnetic tape T, the motor M is driven at a high rotating speed. While the magnetic tape T is being rewound at a high winding speed, the magnetic head H reads signals recorded on the magnetic tape T for automatic seek operation. Since the driving cam surface 17a of the second changeover cam 17 extends on the opposite sides of the center line L$_2$, the base plate 20 biased in the direction B by the spring 21 applies no moment of force to the second changeover cam 17, and hence the mode changeover gear 15 is held stably at a position shown in FIG. 7.

Changeover to the REW Mode (FIGS. 7 and 8):

In changing the operating mode of the tape player from the review mode shown in FIG. 7 to the REW mode, the motor M is actuated for rotation in a clockwise direction to rotate the driving gear 9 in a clockwise direction. Consequently, the planet pinion 12 revolves around the driving gear 9 in a clockwise direction and, finally, engages the teeth 15b of the mode changeover gear 15. As the motor M continues rotating in the clockwise direction, the mode changeover gear 15 is rotated in a clockwise direction and the driving cam surface 17a of the second changeover cam 17 leaves the lug 20a of the base plate 20 to allow the spring 21 to retract the base plate 20 in the direction B. Then, the stopping cam surface 17b of the second changeover cam 17 comes in plane contact with the lug 20a to hold the base plate 20 stably at a position shown in FIG. 8. In this state, the magnetic head H is separated from the magnetic tape T. When the motor M is actuated again for rotation in a counterclockwise direction to rotate the driving gear in a counterclockwise direction, the planet pinion 12 starts revolving from a position indicated by a broken line in FIG. 8 in a counterclockwise direction around the driving gear 9 and, finally, engages the rewinding reel gear 5. The torque of the motor M is transmitted through the driving gear 9 and the planet pinion 12 to the rewinding reel gear 5 to rotate the rewinding reel spindle 3 together with the rewinding reel gear 5 in a counterclockwise direction. Consequently, the magnetic tape T is wound on the rewinding reel of the tape cassette. In rewinding the magnetic tape T, the motor M operates at a high rotating speed to rewind the magnetic tape T at a high winding speed.

Figure 3:
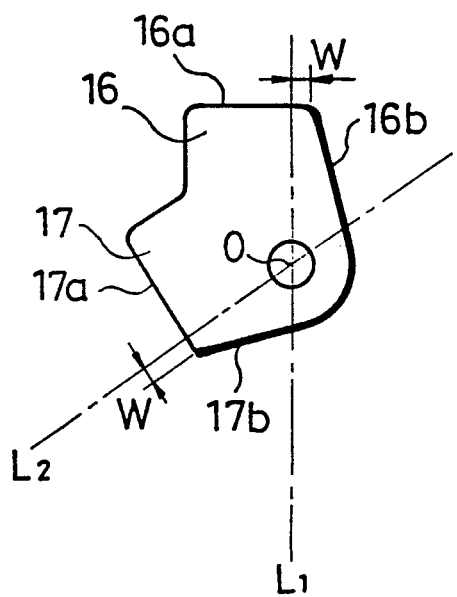
FIG. 3 is a plan view of a changeover cam included in a mode changeover mechanism in a second embodiment according to the present invention.

Second Embodiment (FIG. 3):

A mode changeover mechanism in a second embodiment according to the present invention is substantially the same in construction and function as the mode changeover mechanism in the first embodiment, except that the mode changeover mechanism in the second embodiment employs a first changeover cam 16 and a second changeover cam 17 as shown in FIG. 3.

Referring to FIG. 3, the stopping cam surface 16b of the first changeover cam 16 is oblique to the center line $L_1$ and, similarly, the stopping cam surface 17b of the second changeover cam 17 is oblique to the center line $L_2$. In the second embodiment, the base plate 20 comes into contact with the stopping cam surface 16b or 17b after the driving cam surface 16a of the first changeover cam 16 or the driving cam surface 17a of the second changeover cam 17 has moved away from the base plate 20 and is held stably in place. Desirably, the driving cam surfaces 16a and 17a extend on the opposite sides of the center lines $L_1$ and $L_2$ respectively to prevent the base plate 20 biased in the direction B by the spring 21 to apply moment of force to neither the first changeover cam 16 nor the second changeover cam 17.

Figure 11:
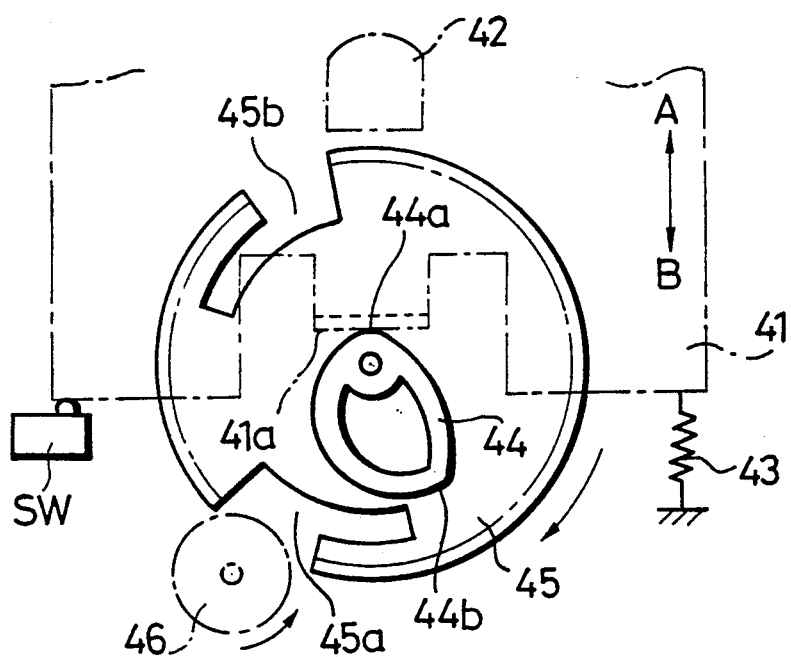
FIG. 11 is a plan view of a conventional mode changeover mechanism for a tape player.

Although each of the foregoing embodiments employs the planet pinion 12 to transmit the torque of the motor M to the mode changeover gear 15, the mode changeover mechanism of the present invention may employ the combination of the stationary driving gear 46 and the mode changeover gear 45 as shown in FIG. 11 to drive the changeover cams.

Third Embodiment (FIGS. 9 and 10):

A mode changeover mechanism in a third embodiment according to the present invention will be described hereinafter with reference to FIGS. 9 and 10, in which parts like or corresponding to those of the mode changeover mechanism in the first embodiment are denoted by the same reference characters.

Figure 9:
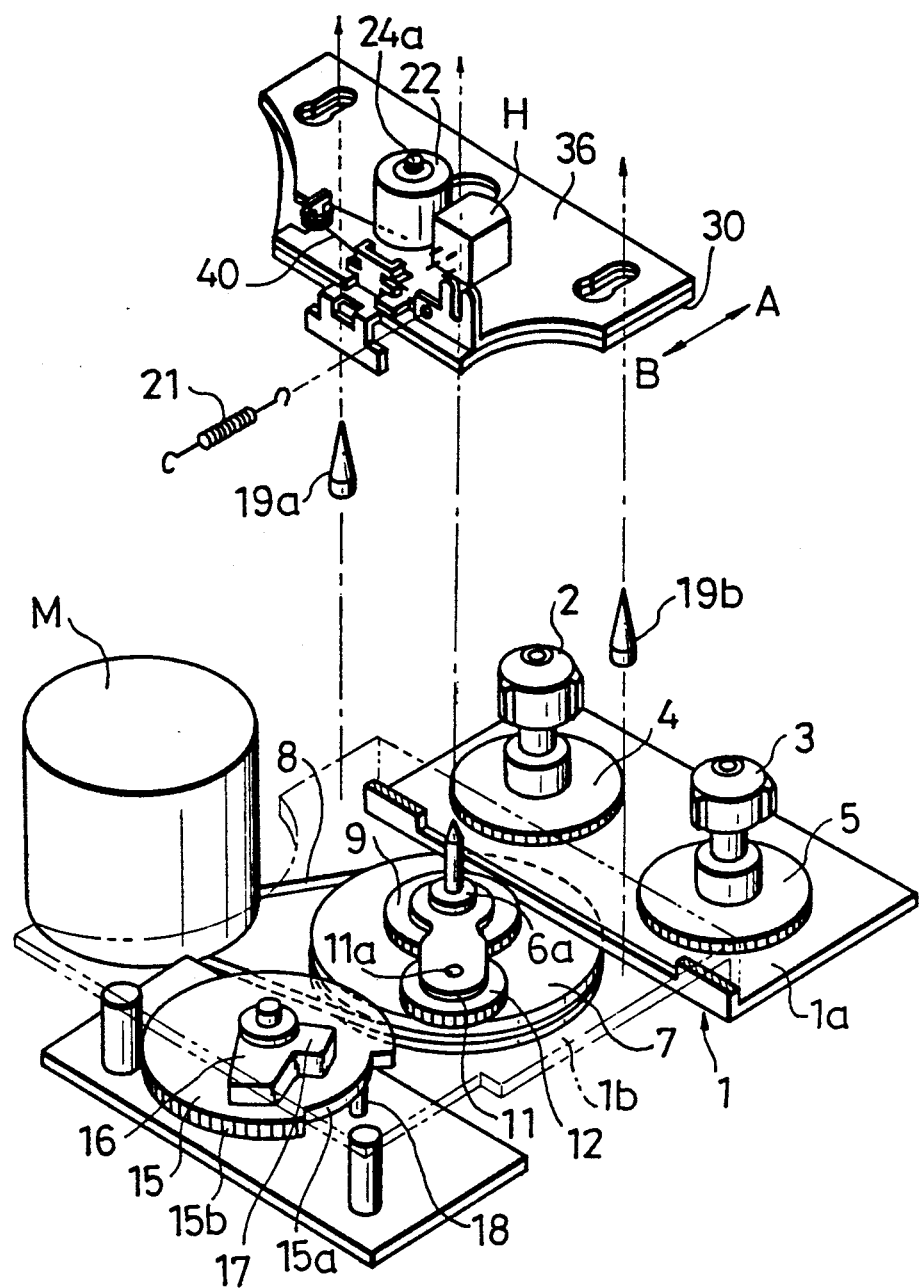
FIG. 9 is a perspective view of an essential portion of a tape player incorporating a mode changeover mechanism in a third embodiment according to the present invention.

Referring to FIG. 9, a slide plate 30 is provided on the upper section 1b of a chassis 1, and a base plate 36 is placed over the slide plate 30. As best shown in FIG. 10, portions of the rear end of the slide plate 30 are bent to form an upper guide lug 31 and a lower guide lug 32. A pair of guide slots 33 elongate in directions A and B are formed in the slide plate 30 respectively near the right and left side edges. When the slide plate 30 is placed on the chassis 1, the guide slots 33 receive guide pins 19a and 19b respectively, and the lower guide lug 32 is received through a guide slot 1c formed in the chassis 1. Thus, the slide plate 30 is guided by the guide pins 19a and 19b and the guide slot 1c for sliding motion in the directions A and B.

The lower end of the lower guide lug 32 engages a first changeover cam 16 and a second changeover cam 17. The slide plate 30 is moved to a position for the play mode or the review mode by the first changeover cam 16 or the second changeover cam 17 according to the action of a mode changeover gear 15.

Figure 10:
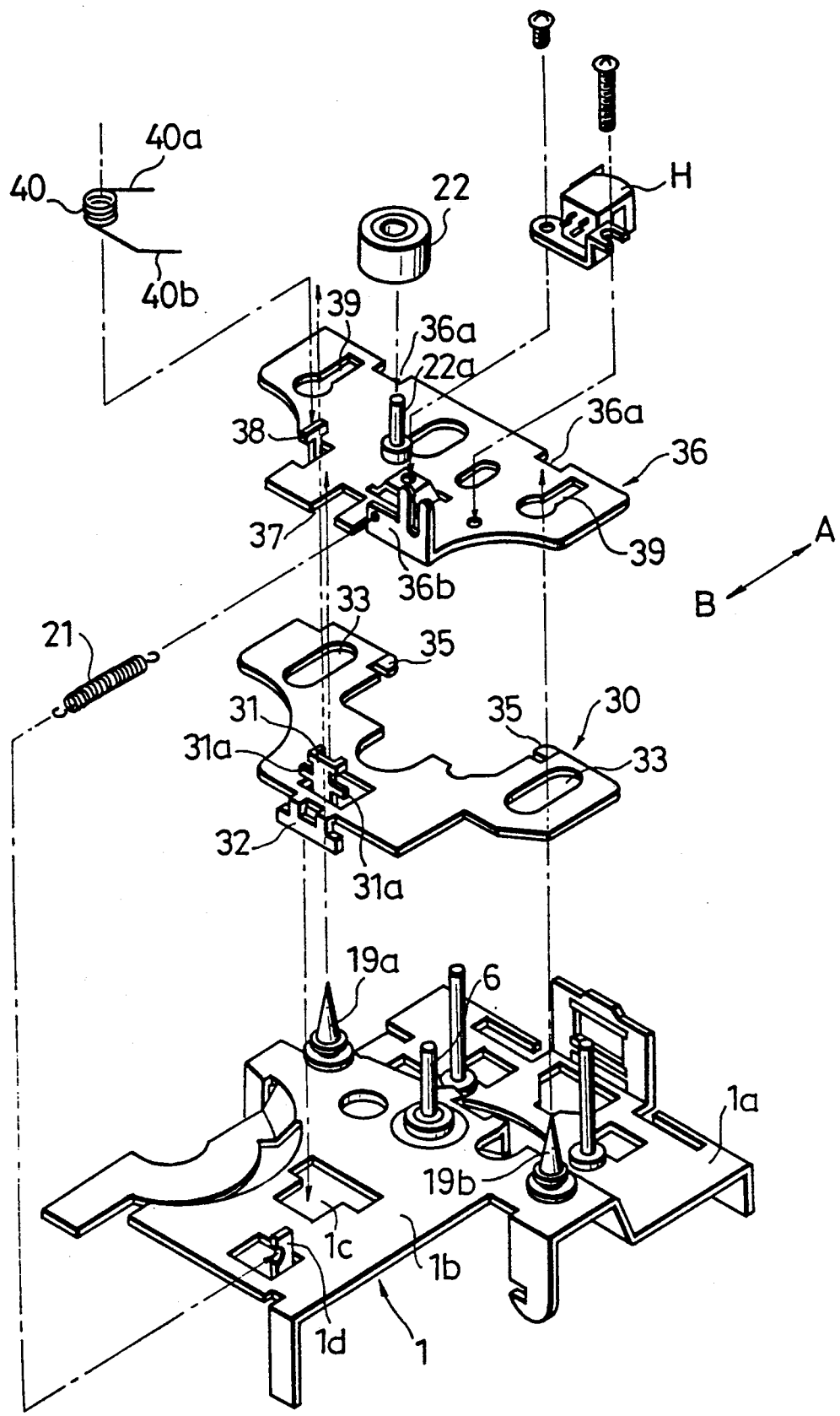
FIG. 10 is an exploded perspective view of the essential portion of the tape player of FIG. 9.

As shown in FIG. 10, a pinch roller 22 is supported for rotation on a spindle 22a fixed to the base plate 36. A guide recess elongate in directions A and B is formed in the rear end of the base plate 36, and a pair of guide slots 39 elongate in the directions A and B are formed respectively near the side edges of the base plate 36. When the base plate 36 is placed on the slide plate 30 placed on the chassis 1, the guide pins 19a and 19b are received respectively in the guide slots 39, and the neck of the upper guide lug 31 of the slide plate 30 under lateral projections 31a projecting in opposite directions from the middle portion of the upper guide lug 31 is received in the guide recess 37 of the base plate 36. A torsion coil spring 40 is put on an upright projection 38 projecting upward from the rear portion of the base plate 36 as shown in FIG. 10. The torsion coil spring 40 has one end 40a put on the lower end of the spindle 22a and the other end 40b put on the upper guide lug 31 of the slide plate 30 to bias the base plate 36 in the direction A relative to the slide plate 30.

Portions of the front end of the slide plate 30 symmetrical with respect to the center line of the slide plate 30 extending in the directions A and B are raised obliquely upward to form a pair of stoppers 35. The stoppers 35 engage recesses 36a formed in the front end of the base plate 36 to limit the movement of the base plate 36 in the direction A relative to the slide plate 30 to a position where the base plate 36 is superposed exactly on the slide plate 30. A spring 21 is extended between a lug 36b formed at the rear end of the base plate 36 and a projection 1d formed at the rear end of the chassis 1 to bias the slide plate 30 and the base plate 36 in the direction B. The slide plate 30 and the base plate 36 slide in a unit on the chassis 1 in the directions A and B. The sliding motion of the slide plate 30 and the base plate 36 is guided by the guide pins 19a and 19b. When the slide plate 30 is moved by the first changeover cam 16 or the second changeover cam 17 in the direction A, the base plate 36 is caused to move together with the slide plate 30 by the resilience of the torsion coil spring 40 biasing the base plate 36 in the direction A relative to the slide plate 30. When the driving cam surface of the first changeover cam 16 or the second changeover cam 17 leaves the lower guide lug 32 of the slide plate 30, the spring 21 retracts the base plate 36 in the direction B, and then the bottom side of the guide recess 37 pushes the slide plate 30 at the upper guide lug 31, so that the slide plate 30 is retracted in the direction B together with the base plate 36. Since the upper guide lug 31 of the slide plate 30 is able to move in the directions A and B in the guide recess 37 of the base plate 36, the slide plate 30 is able to slide in the directions A and B relative to the base plate 36.

Thus, in changing the operating mode of the tape player, the lower guide lug 32 of the slide plate 30, which corresponds to the lug 20a of the base plate 20 of the mode changeover mechanism in the first embodiment, cooperates with the driving cam surfaces 16a and 17a and the stopping cam surfaces 16b and 17b of the changeover cams 16 and 17. The mode changeover mechanism in the third embodiment, as well as the mode changeover mechanism in the first embodiment, is capable of surely achieving mode changeover operation.

Although the invention has been described with reference to its preferred embodiments with a certain degree of particularity, many changes and variations are possible therein. It is therefore to be understood that the invention may be practiced otherwise than as specifically described herein without departing from the scope thereof.

What is claimed is:

1. A mode changeover mechanism for a tape player for recording signals on a magnetic tape and reproducing signals recorded on the magnetic tape, comprising:

a base plate, a magnetic head mounted on said base plate, said base plate disposed to move toward the magnetic tape to bring the magnetic head into contact with the magnetic tape and away from the magnetic tape to separate the magnetic head from the magnetic tape, said base plate moving in a direction of movement which is substantially along a straight line;

a spring biasing said base plate away from the magnetic tape to separate the magnetic head from the magnetic tape;

a changeover cam for moving said base plate toward the magnetic tape against the resilience of the spring; and a motor for driving the changeover cam for rotation;

characterized in that the changeover cam has a flat cam surface, and when said flat cam surface is in contact with said base plate, said base plate is in a position such that the magnetic head is in contact with the magnetic tape, and while said base plate is in said position, said flat cam surface is disposed perpendicular to and intersecting a center line passing through the center of rotation of the changeover cam, said center line extending in a direction parallel to said direction of movement of said base plate.

2. A mode changeover mechanism for a tape player for recording signals on a magnetic tape and for reproducing signals recorded on the magnetic tape, comprising:

a base plate, a magnetic head mounted on said base plate, said base plate disposed to move toward the magnetic tape to bring the magnetic head into contact with the magnetic tape and away from the magnetic tape to separate the magnetic head from the magnetic tape, said base plate moving in a direction of movement which is substantially along a straight line;

a spring biasing said base plate away from the magnetic tape to separate the magnetic head from the magnetic tape;

a changeover cam for moving said base plate toward the magnetic tape against the resilience of the spring; and a motor for driving the changeover cam for rotation;

characterized in that the changeover cam has a flat driving cam surface, and when said flat driving cam surface is in contact with said base plate, said base plate is in a playing position such that the magnetic head is in contact with the magnetic tape, said changeover cam also having a flat stopping cam surface, and when said flat stopping cam surface is in contact with said base plate, said base plate is in a stopping position such that the magnetic head is separated from the magnetic tape, and while said base plate is held in said playing position, said flat driving cam surface is disposed perpendicular to and intersecting a first center line passing through the center of rotation of the changeover cam, said center line extending in a direction parallel to said direction of movement of said base plate.

3. A mode changeover mechanism of claim 1 wherein said base plate has a flat lug disposed perpendicular to said direction of movement of said base plate, substantially all of said flat lug being in contact with said flat cam surface when the magnetic head is in contact with the magnetic tape.

4. A mode changeover mechanism of claim 2, wherein when said base plate is held in said stopping position, said flat stopping cam surface intersects a second center line passing through the center of rotation of the changeover cam and extending in a direction parallel to said direction of movement of said base plate.

5. A mode changeover mechanism of claim 2 wherein said base plate has a flat lug disposed perpendicular to the direction of movement of said base plate, substantially all of said flat lug being contact with said flat driving cam surface when said base plate is in said playing position, and substantially all of said flat lug being in contact with said stopping cam surface when said base plate is said stopping position.

* * * * *